US012718216B2

(12) United States Patent
Clark et al.

(10) Patent No.: US 12,718,216 B2
(45) Date of Patent: Aug. 25, 2026

(54) SYNCHRONIZING SHELF INPUT/OUTPUT SYSTEMS AND TRANSACTION SYSTEMS

(71) Applicant: TOSHIBA GLOBAL COMMERCE SOLUTIONS, INC., Durham, NC (US)

(72) Inventors: Theodore R. Clark, Allendale, NJ (US); Susan W. Brosnan, Raleigh, NC (US); Brian D. Taylor, Durham, NC (US); Kirk Goldman, Cary, NC (US); Manda Miller, Raleigh, NC (US); Kristen M. Chung, Cornelius, NC (US); Pawita Sunthornpong, Chapel Hill, NC (US); Samuel C Champagne, Raleigh, NC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 104 days.

(21) Appl. No.: 18/674,624

(22) Filed: May 24, 2024

(65) Prior Publication Data

US 2025/0363474 A1 Nov. 27, 2025

(51) Int. Cl.
*G06Q 20/20* (2012.01)

(52) U.S. Cl.
CPC .................................. *G06Q 20/201* (2013.01)

(58) Field of Classification Search
None
See application file for complete search history.

(56) References Cited

U.S. PATENT DOCUMENTS 5,382,779 A * 1/1995 Gupta ................ G06Q 30/0283 235/494
7,363,548 B2 * 4/2008 Ramsden ............ H04L 41/0686 714/39
7,827,442 B2 * 11/2010 Sharma .................... G05B 9/03 714/13
11,776,021 B1 * 10/2023 Gyanchandani ... G06Q 30/0283 705/400
2005/0262194 A1 * 11/2005 Mamou ................. G06F 16/254 709/203
2006/0069717 A1 * 3/2006 Mamou .................. G16H 40/20 709/203
2009/0094140 A1 * 4/2009 Kwan .................... G06Q 30/06 705/28
2010/0010868 A1 * 1/2010 Aimone Catti ...... G06Q 10/087 705/28
2015/0286759 A1 * 10/2015 Rehtanz .................. G06F 30/33 703/18
2025/0265644 A1 * 8/2025 Tarmann ................ G06Q 40/03

FOREIGN PATENT DOCUMENTS

JP 4831979 B2 12/2011
JP 4989799 B2 8/2012

* cited by examiner

*Primary Examiner* — Fateh M Obaid
(74) *Attorney, Agent, or Firm* — Patterson + Sheridan, LLP; Gero G. McClellan

(57) ABSTRACT

Method and apparatus for data synchronization are provided. An updated value for a physical item for sale in a space is identified, and the updated value is transmitted to a shelf input/output system. One or more delay criteria are determined based on comparing the updated value and a prior value for the physical item. Confirmation that the updated value has been implemented by the shelf input/output system is received. A transaction system is updated based on the updated value in accordance with the one or more delay criteria and the confirmation.

20 Claims, 6 Drawing Sheets

SYNCHRONIZING SHELF INPUT/OUTPUT SYSTEMS AND TRANSACTION SYSTEMS

BACKGROUND

In many user-facing environments, multiple computing systems are used to track data updates and provide updated information to users. For example, retail environments often include transaction-focused systems (e.g., point of sale (POS)) systems) as well as information-providing or display systems (e.g., electronic shelf labels (ESLs)). In many conventional environments, updating of the information-providing systems (which may include ESLs and/or paper shelf labels) is an entirely separate process from updating the transaction system(s), and conventional approaches do not enable effective elimination of value discrepancies (e.g., price differences) between these disparate systems. Such pricing inconsistencies are subject to audits, which can result in retailers paying substantial fines (in addition to being subject to negative publicity and/or user reviews or sentiment). In addition, such information discrepancies can cause substantial loss of revenue, as users may decide not to complete the transaction when confronted with unexpected price differences.

DETAILED DESCRIPTION

Figure 1:
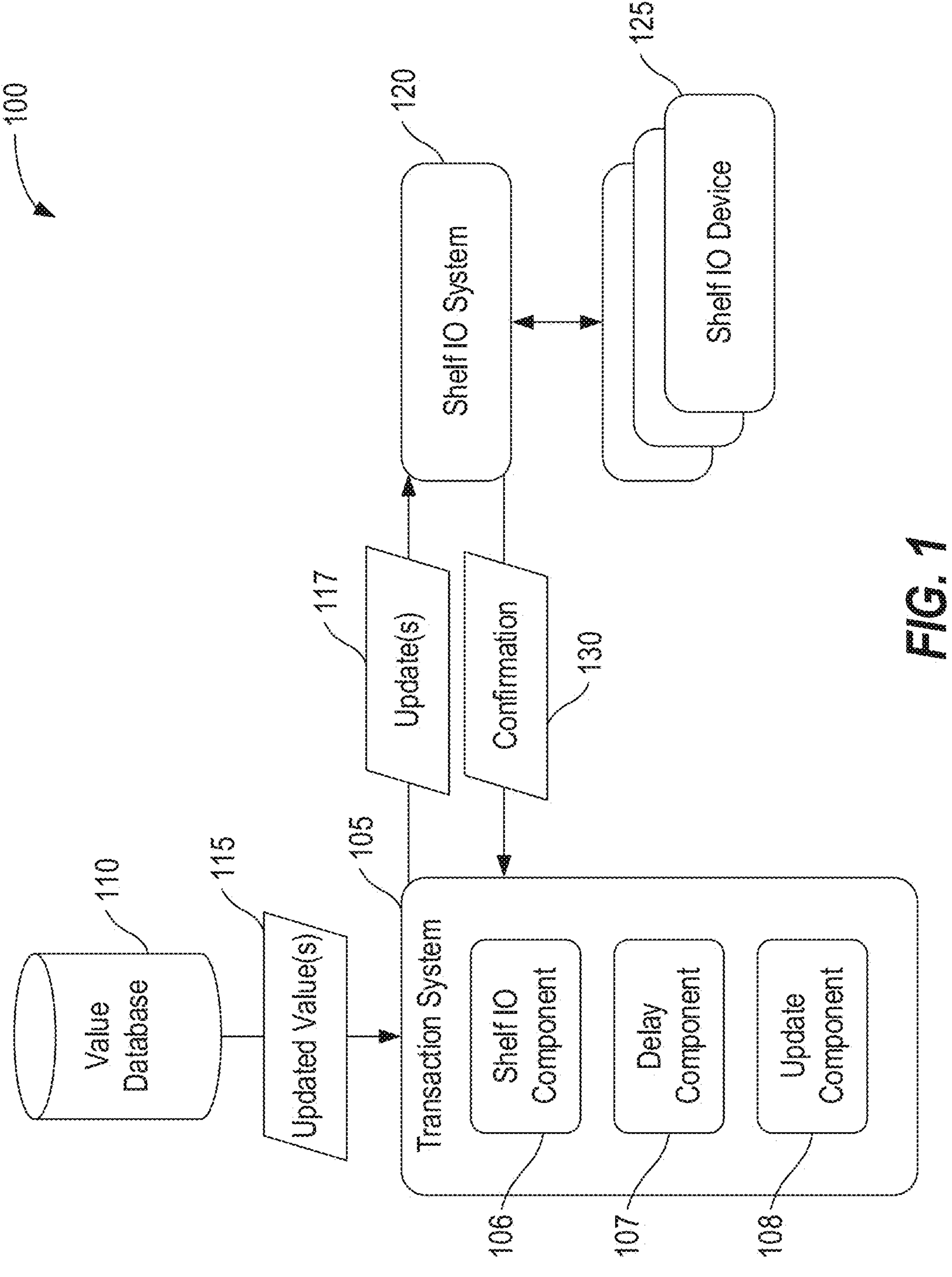
FIG. 1 depicts an example environment for enabling effective data synchronization among computing systems, according to some embodiments of the present disclosure.

Embodiments of the present disclosure provide techniques and systems for efficient and automated value synchronization among computing systems.

In some embodiments, value updates (e.g., changes to the price of items in a retail environment) for transaction computing system(s) and shelf input/output (IO) system(s) can be managed through a single system (e.g., the transaction system), where the single system manages updates to itself as well as to the other system (e.g., the shelf IO system). For example, if the price of a given item is being updated in the transaction system (e.g., in the database used by the transaction system to complete transactions), the transaction system may determine whether the updated price is displayed or implemented on the shelf IO system. If not, the transaction system may execute an update to the shelf IO system to reflect the correct price applied by the transaction system (e.g., at checkout, also referred to the "register price").

In some embodiments, the transaction system can be used to synchronize the timing of value updates to the transaction system, relative to the shelf IO system. In many cases, audits pass (e.g., no fines or other punishment are applied) if the user receives an advantage from an update discrepancy. For example, if the value reflected by the shelf IO system is higher than the value applied by the transaction system (e.g., the item is actually cheaper than the user expected), the user benefits from the discrepancy. In some embodiments, therefore, the transaction system may ensure that any price changes that increase the price are first confirmed or implemented on the shelf IO system, prior to updating the transaction system. In some embodiments, as inaccurate higher prices in the shelf IO system may reduce user engagement (e.g., causing users to refrain from selecting items due to the inaccurate price), the transaction criteria may determine fixed or dynamic delay criteria to ensure that the pricing is synchronized quickly without surprising users by a higher checkout price.

In some embodiments, updates that lower the price of an item by a relatively small amount (e.g., a fixed amount defined by the retailed, such as less than a dollar) may be implemented at any time (e.g., setting the delay criteria to zero, or determining not to delay updating of the transaction system). In some embodiments, changes that reduce the price by more than the defined threshold may be subject to the update synchronization approaches described in more detail below. That is, in some embodiments, when value update(s) are provided, the transaction system may calculate or determine which updates should use delay update operations (e.g., increasing the price, changing the unit pricing scheme, adding or removing a promotion, and the like). In some embodiments, such changes may be marked as delayed by the transaction system, and the transaction system may continue operating off the prior value (e.g., while the shelf IO system is updated). In some aspects, once the transaction system receives confirmation that the update was successfully executed or implemented by the shelf IO system, the transaction system can update its own values.

In some embodiments, this confirmation may be received directly from the shelf IO device(s). For example, in some embodiments, shelf IO devices may be capable of bidirectional communication (e.g., receiving updated information from a shelf IO managing system, as well as returning confirmation or acknowledgement that the updates have been implemented). In some such embodiments, the shelf IO management system may therefore wait until each shelf IO device associated with the update (e.g., each shelf IO device associated with the stock keeping unit (SKU) that is being updated) confirm that they are displaying the updated information. The shelf IO system may then return confirmation to the transaction system.

In some embodiments, the updates to shelf IO devices may not be a one-to-one correlation and/or one or more of the shelf IO devices may be incapable of bidirectional communication. For example, some shelf IO devices may receive updated information (e.g., via infrared optical links), but may be unable to return a response to the shelf IO system. In some embodiments, the system may employ one or more cameras to confirm the update(s) of the shelf IO device(s). That is, one or more images depicting the relevant shelf IO devices may be captured and analyzed to confirm whether the displayed information was updated, as expected. The transaction system may then proceed with the update once the shelf IO devices are updated.

Example Environment for Enabling Effective Data Synchronization Among Computing Systems FIG. 1 depicts an example environment 100 for enabling effective data synchronization among computing systems, according to some embodiments of the present disclosure.

In the illustrated example, a transaction system 105 is communicably coupled with a value database 110 and a shelf IO system 120. Although depicted as discrete components for conceptual clarity, in some aspects, the operations of the transaction system 105, the value database 110, and the shelf IO system 120 may be combined or distributed across any number of systems. The transaction system 105, the value database 110, and the shelf IO system 120 may be communicably linked via any suitable technology, including one or more wired links, one or more wireless links, or a combination of wired and wireless links. For example, the transaction system 105, the value database 110, and the shelf IO system 120 may be connected via a local network in a physical enterprise (e.g., a retail store such as a grocery store).

In the illustrated example, the transaction system 105 accesses updated value(s) 115 from the value database 110. As used herein, "accessing" data may generally include receiving, retrieving, requesting, obtaining, generating, collecting, or otherwise gaining access to the data. The value database 110 generally corresponds to one or more data repositories that store or maintain various information related to physical items (e.g., products) available or present in the physical environment. For example, the value database 110 may store the current, future, and/or prior values for variables such as the price, the unit scheme, any applicable promotions, the inventory (e.g., number of items available), and the like. In some embodiments, the value database 110 generally includes any information that affects the price user(s) will pay for the physical item(s). In some embodiments, the value database 110 maintains this information on a per-item basis, such as using unique identifiers for each physical item type (e.g., for each SKU).

In some embodiments, the transaction system 105 updates the value database 110. That is, updates to the value(s) may be provided to the value database 110 via the transaction system 105 (e.g., by a user using a terminal). In some aspects, one or more other systems may update the value database 110 (e.g., one or more users may use one or more other terminals to update the values). In the illustrated example, updated values 115 are provided to or accessed by the transaction system 105. In some embodiments, the updated values 115 are provided using a push mechanism (e.g., where the value database 110 transmits the updates, or notifications that updates are available, as they occur, periodically, and/or in response to various events occurring). In some embodiments, the updated values 115 are provided using a pull mechanism (e.g., where the transaction system 105 requests information relating to any values that have been updated periodically and/or in response to various events occurring, such as if a user requests up-to-date value information for a given item).

In the illustrated example, the transaction system 105 includes a shelf IO component 106, a delay component 107, and an update component 108. Although depicted as discrete components for conceptual clarity, in embodiments, the operations of the depicted components (and others not illustrated) may be combined or distributed across any number of components and systems.

In the illustrated example, the shelf IO component 106 is generally used to update the shelf IO system 120 whenever updated values 115 are received. That is, as illustrated, the shelf IO component 106 may transmit updates 117 (e.g., the updated value(s) 115 or any relevant information derived therefrom) to the shelf IO system 120. For example, in some embodiments, if the updated values 115 include a new price per unit, the shelf IO component 106 may transmit the updated values 115 to the shelf IO system 120, instructing the shelf IO system 120 to implement the updated value (e.g., to cause the relevant shelf IO devices 125 to depict the updated price). As another example, if the updated values 115 indicate a newly applicable promotion for an item (e.g., buy-one-get-one), the shelf IO component 106 may instruct the shelf IO system 120 to update the corresponding shelf IO devices 125 to indicate the promotion.

In the illustrated example, the shelf IO system 120 receives updates 117 from the shelf IO component 106, and updates the relevant shelf IO device(s) 125 accordingly. For example, the shelf IO system 120 may maintain a mapping or database identifying the shelf IO device(s) 125 in the space (e.g., by unique identifiers such as their media access control (MAC) addresses), as well as indicating the physical items (e.g., SKUs) that each shelf IO device 125 corresponds to (e.g., the item(s) for which each shelf IO device 125 displays information such as pricing). When an update 117 is received, the shelf IO system 120 may determine which item(s) are affected by the update 117, and then identify the relevant shelf IO devices 125 for the determined item(s). As illustrated, the shelf IO system 120 can then update the relevant shelf IO devices 125.

Generally, the techniques used to update the shelf IO devices 125 may vary depending on the implementation. For example, in some embodiments, the shelf IO system 120 may use a bidirectional communication link (e.g., a WiFi link) to the shelf IO devices 125 to push the updated information to the relevant shelf IO device(s) 125. In some embodiments, the shelf IO system 120 may use unidirectional links to update the shelf IO devices 125, such as infrared optical links (e.g., transmitting an infrared signal that is detected by infrared receivers on the shelf IO device(s) 125.

In some embodiments, using a push mechanism to update the shelf IO devices 125, the shelf IO system 120 can substantially extend the lifetime of the shelf IO devices 125. For example, the shelf IO devices 125 may be battery powered devices that are usually in a dormant or non-active state until an update is received. When an update is received, the shelf IO device 125 may update its display and return to the dormant state. This can improve battery life of the devices. In some embodiments, the shelf IO devices 125 may similarly use a non-volatile display (e.g., an electronic ink display) that can maintain the depicted information with no (or very little) power consumption. For example, a relatively small amount of power may be used to change the display, which then remains fixed until the next update.

In some embodiments, one or more of the shelf IO devices 125 can return or transmit a response to the shelf IO system 120 to indicate that the update has been implemented on the display(s). In response, the shelf IO system 120 may inform the transaction system 105 that the updates are complete via the confirmation 130. In some embodiments, if the shelf IO device(s) 125 are not able to provide this confirmation, one or more other techniques or approaches may be used. For example, in some embodiments, a user (e.g., an employee) may visually inspect each relevant shelf IO device 125, and confirm that the update has been completed (e.g., via a tablet or smartphone communicably connected to the shelf IO system 120 and/or the transaction system 105).

As another example, in some embodiments, one or more cameras or other imaging sensors in the environment 100 may capture image(s) depicting the relevant shelf IO device(s) 125. These image(s) may then be evaluated using one or more machine learning techniques, such as optical character recognition (OCR) and/or object recognition, in order to determine whether the shelf IO devices 125 have been updated. If so, the confirmation 130 may be returned to the transaction system 105.

As used herein, "implementing" the update on the displays and/or by the shelf IO system 120 and/or shelf IO devices 125 may generally correspond to updating the displays to indicate or output the updated values. Similarly, "implementing" the update on the transaction system 105 may generally correspond to updating the value used to quantify transactions, such as the price charged to users for the items.

In the illustrated example, before, during, or after the update(s) 117 are sent to the shelf IO system 120, the delay component 107 may determine or select one or more delay criteria for the updated values 115. The delay criteria generally indicate when the transaction system 105 should update its own records to reflect the updated value(s) 115. As discussed above, when the values used by the transaction system 105 are updated, the new value(s) are applied to user transactions. For example, at check-out, the updated value(s) will be used for selected items, which may affect the price of the items and/or the overall cost of the transaction.

In some embodiments, the delay component 107 uses a set of rules or mappings to determine the delay criteria. For example, in some embodiments, the delay component 107 may compare the updated value(s) 115 to the prior value(s) for the item(s). If the updated value(s) 115 are less than the prior value(s), the delay component 107 may determine to implement the update immediately. That is, because user(s) will not be harmed by the change, the delay component 107 may determine that there is no reason to delay the update. For example, even if the shelf IO system 120 and the transaction system 105 are out of sync, the user will receive a lower price at check-out than they expected based on the shelf IO device(s) 125. As such discrepancies are unlikely to cause negative sentiment or incur audit fees, the delay component 107 may determine to proceed with the update immediately.

In some embodiments, the delay component 107 may proceed to implement the update immediately if the reduction in price is below a threshold (e.g., less than a dollar). In some embodiments, reductions by more than the threshold may be delayed some amount. That is, the delay component 107 may determine a non-zero delay amount, such as to slowly implement the update (e.g., reducing the price in increments, such as 25 cents, periodically, such as every few minutes). As another example, the delay component 107 may determine to wait for user confirmation (e.g., from a manager) before implementing the update. As another example, the delay component 107 may determine to implement the update after a defined period of time has elapsed, and/or at a specified time (e.g., after closing time).

In some embodiments, if the updated value 115 is higher than the prior value, the delay component 107 may similarly determine to delay updating of the transaction system 105. For example, the delay component 107 may determine a defined or static period of time for which to delay updating the transaction system 105. As one example, the delay time may be determined or specified (e.g., by a user, such as a manager) based on the average or expected time it takes to traverse the environment. For example, based on how much average time elapses between when a user enters the establishment and when they check-out and/or leave. By delaying by this average amount (plus, in some embodiments, a buffer percentage or value), the delay component 107 can reduce the probability that any users are harmed by the change. That is, the probability is high that any user who saw the prior (lower) price on a shelf IO device 125 will have completed their transaction (e.g., checked out and/or left the store) before the new (higher) price is implemented by the transaction system 105.

In some embodiments, the delay component 107 may use a fixed delay duration for all items based on the traversal time. In some embodiments, the delay component 107 may use different delay durations based on the item being updated. For example, some item(s) may cause longer delays than others, such as based on the items positioning in the store (e.g., where items nearer to the entrance of the environment may be associated with longer delays than items near the register or POS, because less time is likely to elapse between seeing the prior value on a shelf IO device and ending the transaction for item close to the exit region).

In some embodiments, in addition to or instead of fixed delay durations, the delay component 107 may use dynamic delay criteria. For example, in some embodiments, the delay component 107 may determine to delay updating the transaction system 105 until any transactions associated with the prior value are completed. For example, the delay component 107 may identify a set of transactions associated with the prior value (e.g., pending transactions that were initiated before the updated values 115 were received from the value database 110 and/or that were initiated prior to receiving the confirmation 130 that the update was complete, and that have not yet completed or closed). That is, in some embodiments, the associated transactions correspond to pending transactions that were initiated prior to the updated value 115 being received. In some embodiments, the associated transactions correspond to pending transactions that were initiated prior to receiving confirmation 130 that the shelf IO devices 125 were updated to reflect the updated value 115.

The delay component 107 may then delay implementing the updated value on the transaction system 105 until all transactions in the identified set of relevant transactions have completed (e.g., the user has checked out, the user has canceled or otherwise abandoned the transaction, and the like).

Generally, the delay component 107 may use a variety of criteria and techniques to identify the set of associated or relevant transactions and/or transaction initiation point. For example, in some embodiments, some or all of the transactions may be started manually or automatically by the user (e.g., as they enter the store, or by interacting with a user device such as a retail application on the user's smartphone). That is, in some embodiments, the user may initiate a transaction manually using their device, and/or one or more systems in the environment 100 (e.g., the transaction system 105) may automatically initiate a transaction when the user enters the environment (e.g., based on recognizing the user as they enter). In some embodiments, the delay component 107 may therefore identify the pending or open transaction(s) that have a start timestamp prior to the time when the updated value 115 was received (or prior to when the confirmation 130 was received).

As another example, the delay component 107 may identify the set of associated or relevant transactions based on user movement or actions in the environment. For example, in some embodiments, the delay component 107 may identify any user(s) that entered a defined area associated with the physical item (e.g., that entered the store, that entered the aisle where the item is available, that entered a defined radius or distance from the item, that were within line of sight of the shelf IO device(s) 125, and the like) prior to the value update (e.g., prior to receiving the updated value 115 and/or the confirmation 130). The delay component 107 may then identify the transactions associated with these users (e.g., the transactions where a user may have seen the prior value on the shelf IO device(s) 125) as the relevant or associated pending transactions for the update. For example, the delay component 107 may use techniques such as facial recognition or device recognition (based on a personal device carried by the user) to identify the users, and then identify the transaction(s) associated with the users.

As yet another example, the delay component 107 may identify the set of associated or relevant transactions based on user actions such as picking up or selecting the item(s). For example, in some embodiments, the delay component 107 may identify any user(s) that selected the relevant item(s), (e.g., by placing the item(s) in their cart, basket, or other receptacle) prior to the value update (e.g., prior to receiving the updated value 115 and/or the confirmation 130). The delay component 107 may then identify the transactions associated with these users (e.g., the transactions where a user may have selected the item based on the prior value) as the relevant or associated pending transactions for the update. For example, the delay component 107 may use techniques such as facial recognition or device recognition (based on a personal device carried by the user) to identify the users, and then identify the transaction(s) associated with the users.

Generally, a wide variety of delay criteria may be used depending on the implementation.

In the illustrated example, the update component 108 may be used to implemented the updated value 115 on the transaction system 105 in accordance with the delay criteria (determined by the delay component 107) and/or the confirmation 130. For example, the update component 108 may determine whether the delay criteria are satisfied (e.g., the determined duration of time has elapsed, and/or that other criteria or events have occurred, such as the last transaction associated with the prior value has concluded). In some embodiments, the update component 108 determines whether the confirmation 130 has been received (e.g., refraining from updating the transaction system 105 until the confirmation 130 is received).

In some embodiments, the update component 108 or another system evaluates the confirmation 130 to ensure that it is sufficient. For example, the update component 108 (or the shelf IO system 120) determines the number of shelf IO devices 125 associated with the relevant item (e.g., based on the mappings maintained by the shelf IO system 120). The update component 108 (or other system) may then determine whether the number of shelf IO devices 125 that have been updated matches the number of shelf IO devices 125 associated with the item. For example, if there are N shelf IO devices 125 associated with the item and imagery in the environment 100 is used to confirm the updates, the update component 108 may confirm that N devices are depicting the updated value, based on the imagery.

In the illustrated example, once the delay criteria are satisfied and/or the confirmation 130 is received and/or validated, the update component 108 may implement the update on the transaction system 105. That is, the update component 108 may cause the transaction system 105 to begin using the updated value 115, such as whenever the item is entered in a transaction (e.g., scanned at a register, entered via a user device, and the like).

In these ways, the transaction system 105 can ensure that the values remain synchronized across computing systems in a way that reduces or prevents harm to users (e.g., due to surprise increases in price at the register) while implementing uniform values across systems as early as practicable (in accordance with the determine rules and criteria).

Although the illustrated example depicts shelf IO devices 125 configured to update their displays, in some embodiments, the transaction system 105 may similarly interact with physical shelf labels or tags (e.g., paper tags, dry erase boards or chalkboards, and the like). For example, when an updated value 115 is received, the transaction system 105 may monitor the space (e.g., based on input from employees when they post the updated value and/or based on imagery captured by cameras and evaluated using OCR, as discussed above) to confirm when the shelf labels have been updated (e.g., to generate the confirmation 130). This can allow the transaction system 105 to maintain efficient and synchronized updates, even in environments 100 where some or all of the labels are non-electronic.

Example Shelf Input/Output Device

Figure 2:
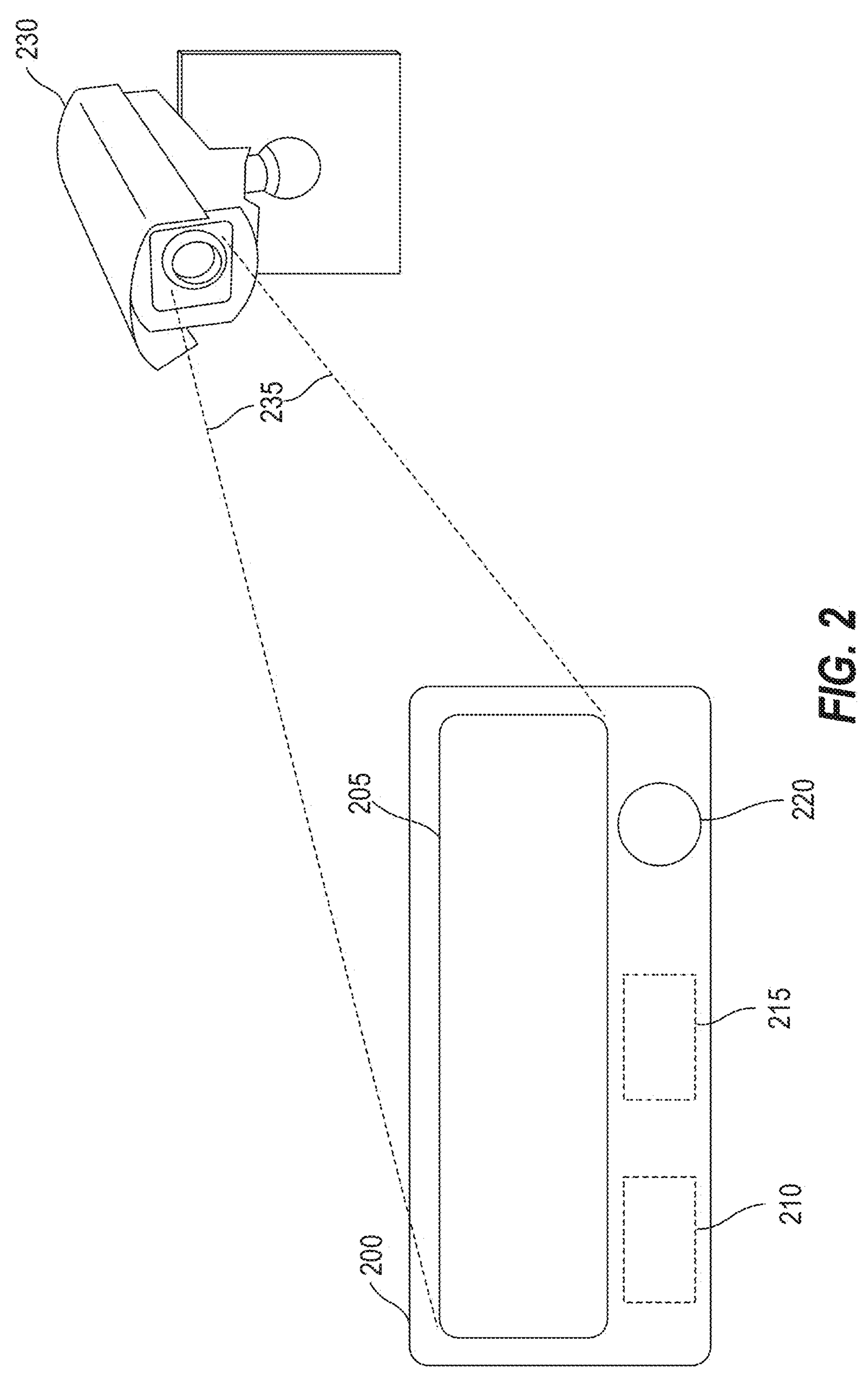
FIG. 2 depicts an example shelf input/output device, according to some embodiments of the present disclosure.

FIG. 2 depicts an example shelf IO device 200, according to some embodiments of the present disclosure. For example, the shelf IO device 200 may correspond to one of the shelf IO device(s) 125 of FIG. 1.

The shelf IO device 200 includes a display 205, Wi-Fi interface 210, NFC interface 215, and a button 220. The display 205 may be an electronic ink display which saves power relative to other types of display screens. If the shelf IO device 200 operates under battery power, the display 205 may be an electronic ink display. But in other embodiments, the display 205 may be other types of displays such as LED or LCD, and may be coupled to a power source rather than being battery operated. In other embodiments, the display 205 may be a touch screen so that a user can interact with it, such as selecting a virtual button indicating the customer wants help or advice from an expert.

The Wi-Fi interface 210 can include a transmitter/receiver (transceiver) for transmitting and receiving Wi-Fi data. For example, the Wi-Fi interface 210 can connect to a Wi-Fi network in the store. The Wi-Fi interface 210 can be used by the store (e.g., by the transaction system 105 and/or the shelf IO system 120, each of FIG. 1) to remotely change what is displayed on the display 205. For example, the price of the product can be updated if the corresponding product is put on sale.

The NFC interface 215 permits the shelf IO device 200 to use NFC to communicate with store employees' devices as well as the customer's user device. A store employee can use the NFC interface 215 to update the display 205, or the customer's user device may use the NFC interface 215 to receive the product ID in order to contact an expert, as discussed above.

The button 220 can be a physical actuated button or a capacitive button. In some embodiments, the shelf IO device 200 may include printed text that instructs a customer to press the button 220 if they would like help (e.g., to contact an expert). This text could be printed on the shelf IO device 200 or could be output on the display 205.

FIG. 2 is just one example of a shelf IO device 200 and its features. For example, other shelf IO devices (e.g., ESL) implementations may not include all the features shown. One shelf IO device may include the Wi-Fi interface 210, but not the NFC interface 215 or the button 220. Another shelf IO device may include the NFC interface 215 but not the Wi-Fi interface 210 but or the button 220. Yet another shelf IO device may include the Wi-Fi interface 210 and the button 220 but not the NFC interface 215. Further, some shelf IO devices may include one-way communication components (e.g., an infrared receiver).

As discussed above, the shelf IO device 200 may generally receive updated values from one or more other systems (such as the shelf IO system 120 of FIG. 1). In some embodiments, the shelf IO device 200 may transmit confirmations that the update(s) have been implemented (e.g., that the updated information is being displayed on the display 205).

In the illustrated example, a camera 230 is configured or installed to capture images depicting all or a part of the shelf IO device 200 (e.g., at least the display 205), as illustrated by the sightlines 235. Although a single camera 230 is depicted for conceptual clarity, in some aspects, multiple cameras 230 may be installed to capture images depicting the shelf IO device 200. Further, although one shelf IO device 200 is depicted for conceptual clarity, in some embodiments, a single camera 230 may be installed to capture images depicting multiple shelf IO devices 200.

In some embodiments, as discussed above, the image(s) captured by the camera(s) 230 can be evaluated (by the camera 230 itself, or by another system, such as the shelf IO system 120 and/or the transaction system 105, each of FIG. 1) to determine whether the display 205 has been updated. In some embodiments, confirming that the display 205 has been updated includes processing all or a part of the image using one or more OCR techniques to determine whether the displayed information matches the updated value(s) for the item. For example, the images may be analyzed to determine whether the price is correct, whether the promotions are accurately displayed, and the like.

In some embodiments, in addition to or instead of verifying the accuracy of the information displayed on the display 205, the image(s) may be evaluated to confirm whether the display 205 was updated in general (regardless of the accuracy). For example, many displays (such as electronic ink displays) exhibit a brief "flash" or other visual effect when the display is updated (e.g., turning to full black and/or full white before displaying the updated information). In some embodiments, a sequence of images may be evaluated to detect whether such a flash (or other effect) occurs on the display 205.

For example, a timestamp when the update was transmitted to the shelf IO system and/or to the shelf IO device 200 may be recorded, and a sequence of images proximate to this time stamp (e.g., beginning at the timestamp and continuing for a defined duration, such as five seconds) may be accessed and evaluated. If the update flash (or other visual effect) is detected during the window, it may be reasonably inferred that the shelf IO device 200 updated the display 205 to depict the new information. This may allow the transaction system 105 and/or the shelf IO system 120 to verify or confirm the update without actually confirming the content or accuracy of the update. This may substantially reduce computational expense, as the visual update effects are generally detectable effectively with simple models (e.g., without relying on machine learning or computer vision approaches).

As discussed above, the imagery provided by the camera 230 may be used to confirm the updates to the shelf IO device(s) 200 (either alone, or in conjunction with explicit feedback from the shelf IO device(s) 200), in order to determine when to implement the update on the transaction system.

Figure 3:
FIG. 3 is a flow diagram depicting an example method for synchronizing updates between shelf input/output systems and transaction systems, according to some embodiments of the present disclosure.
Figure 3:
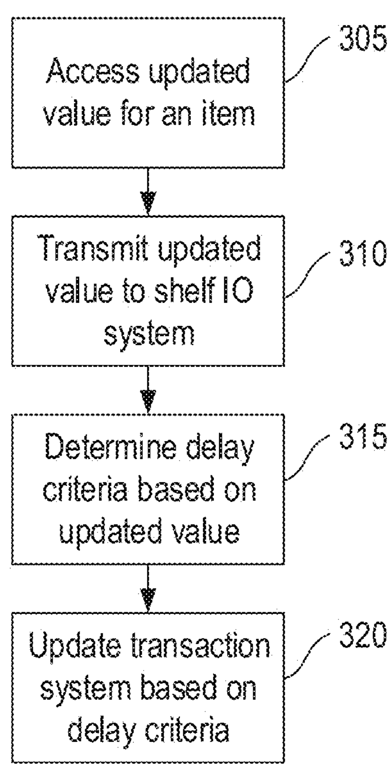

Example Method for Synchronizing Updates Between Shelf Input/Output Systems and Transaction Systems FIG. 3 is a flow diagram depicting an example method 300 for synchronizing updates between shelf input/output systems and transaction systems, according to some embodiments of the present disclosure. In some embodiments, the method 300 is performed by a transaction system, such as the transaction system 105 of FIG. 1.

At block 305, the transaction system accesses an updated value (e.g., an updated value 115 of FIG. 1) for a physical item in a physical environment (e.g., a retail establishment). As discussed above, in some embodiments, the updated value may generally include any updated or modified data that may affect whether users select the item, such as the price, any applicable promotions, the unit scheme, and the like. In some aspects, as discussed above, the updated value is accessed from a user (e.g., an employee or manager), from a value database (e.g., the value database 110 of FIG. 1, and the like.

At block 310, the transaction system transmits the updated value (or information derived therefrom, such as the new unit scheme) to a shelf IO system (e.g., the shelf IO system 120 of FIG. 1). For example, as discussed above, rather than immediately implementing the updated value, the transaction system may transmit the update to the shelf IO system (or other system responsible for the updating of in-store displays). In some embodiments, in addition to or instead of transmitting the update to an electronic or automated display system, the transaction system may transmit the update to one or more users, as discussed above. For example, the transaction system may instruct employee(s) to manually update one or more displays, such as to place a new paper or sticker label, to rewrite or draw a blackboard or dry erase board, and the like.

At block 315, the transaction system determines one or more relevant delay criteria based on the updated value. In some embodiments, as discussed above, determining the delay criteria includes determining a duration to delay updating the transaction system. In some embodiments, as discussed above, determining the delay criteria includes determining one or more events that should occur before updating the transaction system. One example method for determining the delay criteria is discussed in more detail below with reference to FIG. 4.

For example, in some embodiments, the transaction system determines that the delay criteria includes a delay duration of zero (e.g., no delay) in response to determining that the updated value is less than the prior value (e.g., the price is decreasing). In some embodiments, as discussed above, the transaction system may determine that the delay criteria is a delay of zero duration if the decrease is below a threshold, and is greater than zero if the decrease exceeds the threshold, as discussed above.

In some embodiments, the transaction system determines that the delay criteria includes to delay updating the transaction system until pending transactions associated with the prior price are completed (e.g., by checkout, by cancellation, and the like). For example, as discussed above, the transaction system may identify the set of associated transactions that began before the update (or before the shelf IO update was confirmed), transactions where the user entered the store, the aisle, or other physical area relative to the item prior to the update (or prior to the shelf IO update being confirmed), transactions where the user picked up or selected the item prior to the update (or prior to the update being confirmed), and the like. In some embodiments, the transaction system determines that the delay criteria includes confirming that the shelf IO system has been fully updated (e.g., based on explicit signaling, or based on detecting the update using cameras, as discussed above).

At block 320, the transaction system updates the transaction system based on the delay criteria. For example, as discussed above, the transaction system may wait until the determined duration has expired, until the determined event has occurred (e.g., the last pending transaction associated with the prior value has ended), until the update is confirmed on the shelf IO devices, and the like.

Once the criteria are satisfied, the transaction system updates the transaction system itself, as discussed above. That is, the transaction system implements or enables the updated value such that the updated value is used for any ongoing or future transactions (e.g., transactions that have not yet added the item). That is, when a new transaction adds the item (e.g., the item is scanned at a POS), the updated value may be applied.

Figure 4:
FIG. 4 is a flow diagram depicting an example method for determining and evaluating delay criteria to synchronize updates, according to some embodiments of the present disclosure.
Figure 4:
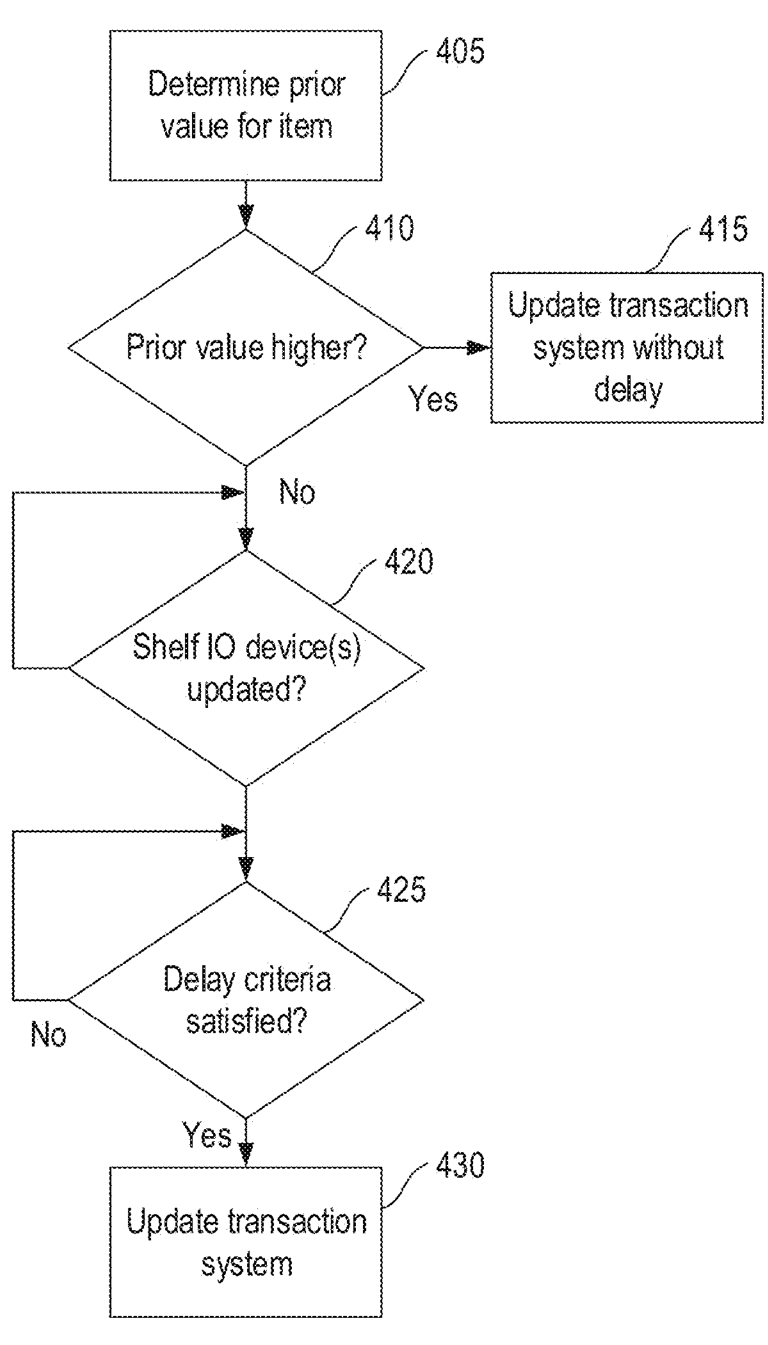

Example Method for Determining and Evaluating Delay Criteria to Synchronize Updates FIG. 4 is a flow diagram depicting an example method 400 for determining and evaluating delay criteria to synchronize updates, according to some embodiments of the present disclosure. In some embodiments, the method 300 is performed by a transaction system, such as the transaction system 105 of FIG. 1. In some embodiments, the method 400 provides additional detail for blocks 315 and/or 320 of FIG. 3.

At block 405, the transaction system determines the prior value for the item that is being updated, as discussed above. That is, if the updated value is referred to as the new "current" value, the transaction system determines what the immediately prior value was. In some embodiments, the new value may alternatively be referred to as the new or updated value, and the value prior to this update may be referred to as the current value.

At block 410, the transaction system determines whether the prior value was higher than the updated value. Stated differently, the transaction system determines whether the change benefits the user(s), such as if the prior unit price was higher than the updated unit price. In some embodiments, this determination may be based on the price itself, as well as based on promotions or other information (e.g., where adding a promotion generally benefits the user, while ending a promotion generally does not).

If the change benefits the user (e.g., the new updated price is lower than the prior or current price), the method 400 continues to block 415. At block 415, the transaction system updates the transaction system without delay. That is, because the change benefits the user, the transaction system may proceed to update the transaction system immediately, because even if updating the shelf IO system fails or is delayed, the discrepancy at the register benefits the user.

Returning to block 410, if the transaction system determines that the change does not benefit the user (e.g., the new price is higher), the method 400 continues to block 420. At block 420, the transaction system determines whether the relevant shelf IO device(s) for the item have been updated. For example, as discussed above, the transaction system may determine whether a confirmation has been received (e.g., from the shelf IO system) indicating that all relevant shelf IO devices are updated. In some embodiments, as discussed above, the transaction system may additionally or alternatively evaluate image data to confirm the updates. For example, as discussed above, the transaction system may use OCR or other techniques to confirm that the displayed information is correct, and/or may use various techniques (e.g., detecting a block of pixels changing to black briefly before changing back to a display) to detect the update without actually verifying the content thereof.

In some embodiments, as discussed above, the transaction system may evaluate the image data (or other indications) to confirm that the number of shelf IO devices associated with the item (e.g., the count of shelf IO devices that depict information for the item in the space) matches the count of shelf IO devices that have been updated, as indicated in the imagery. If the transaction system determines that one or more shelf IO device(s) have not been updated, the method 400 iterates at block 420.

If, at block 420, the transaction system confirms that the shelf IO device(s) are updated, the method 400 continues to block 425. At block 425, the transaction system determines whether the delay criteria are satisfied. For example, as discussed above, the transaction system may determine whether a determined delay duration has elapsed (e.g., since the update was received, or since the update to the shelf IO devices was confirmed at block 420).

As another example, as discussed above, the transaction system may determine whether the set of associated or relevant transactions have completed (e.g., whether any relevant transactions are still open). As discussed above, the set of relevant transactions associated with the prior value may be determined according to a variety of criteria, including identifying transactions that began prior to the update (e.g., prior to confirming the shelf IO system was updated at block 425), transactions where the user entered a defined physical area such as the store, the aisle where the item is, a defined distance to the item, and the like prior to the update (and/or prior to confirming the shelf IO system was updated at block 425), transactions where the user selected the item prior to the update (or prior to the update being confirmed on the shelf IO devices), and the like. If any such transactions remain pending, the transaction system may determine that the criteria are not satisfied.

If, at block 425, the transaction system determines that the delay criteria are not satisfied, the method 400 iterates at block 425. If the transaction system determines that the delay criteria are satisfied, the method 400 continues to block 430. At block 430, the transaction system updates the transaction system. That is, the transaction system implements the update on the transaction system (e.g., at the points of sale, such as registers, self-checkouts, and the like). In this way, future selections or purchases of the item can be priced according to the updated values.

Example Method for Value Updating

Figure 5:
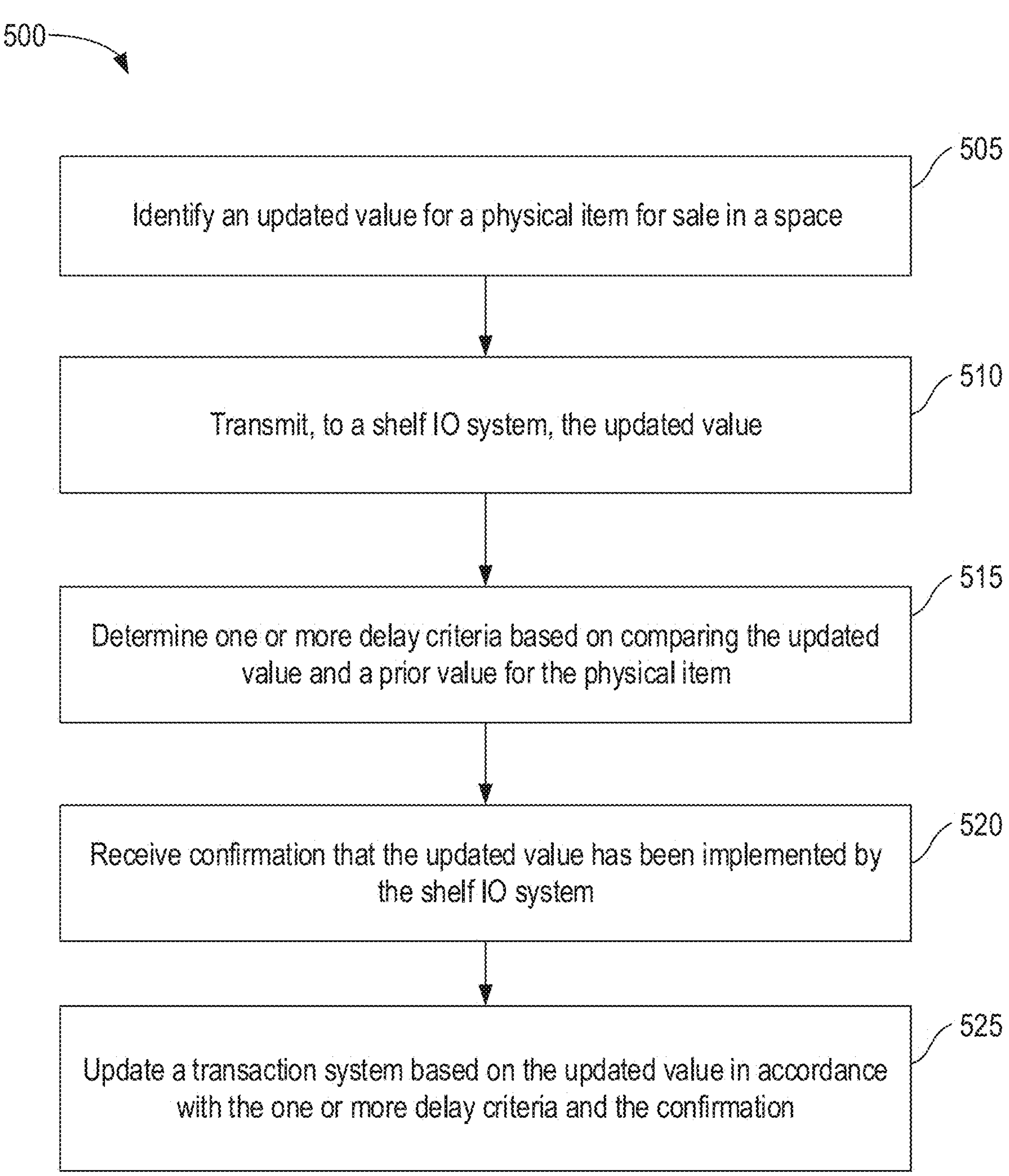
FIG. 5 is a flow diagram depicting an example method for value updating, according to some embodiments of the present disclosure.

FIG. 5 is a flow diagram depicting an example method 500 for value updating, according to some embodiments of the present disclosure. In some embodiments, the method 500 is performed by a transaction system, such as the transaction system 105 of FIG. 1.

At block 505, an updated value (e.g., the updated value 115 of FIG. 1) for a physical item for sale in a space is identified.

At block 510, the updated value is transmitting, to a shelf IO system (e.g., the shelf IO system 120 of FIG. 1).

At block 515, one or more delay criteria are determined based on comparing the updated value and a prior value for the physical item.

At block 520, confirmation (e.g., the confirmation 130 of FIG. 1) that the updated value has been implemented by the shelf IO system is received.

At block 525, a transaction system (e.g., the transaction system 105 of FIG. 1) is updated based on the updated value in accordance with the one or more delay criteria and the confirmation.

Example Computing Device for Synchronizing Computing System Updates

Figure 6:
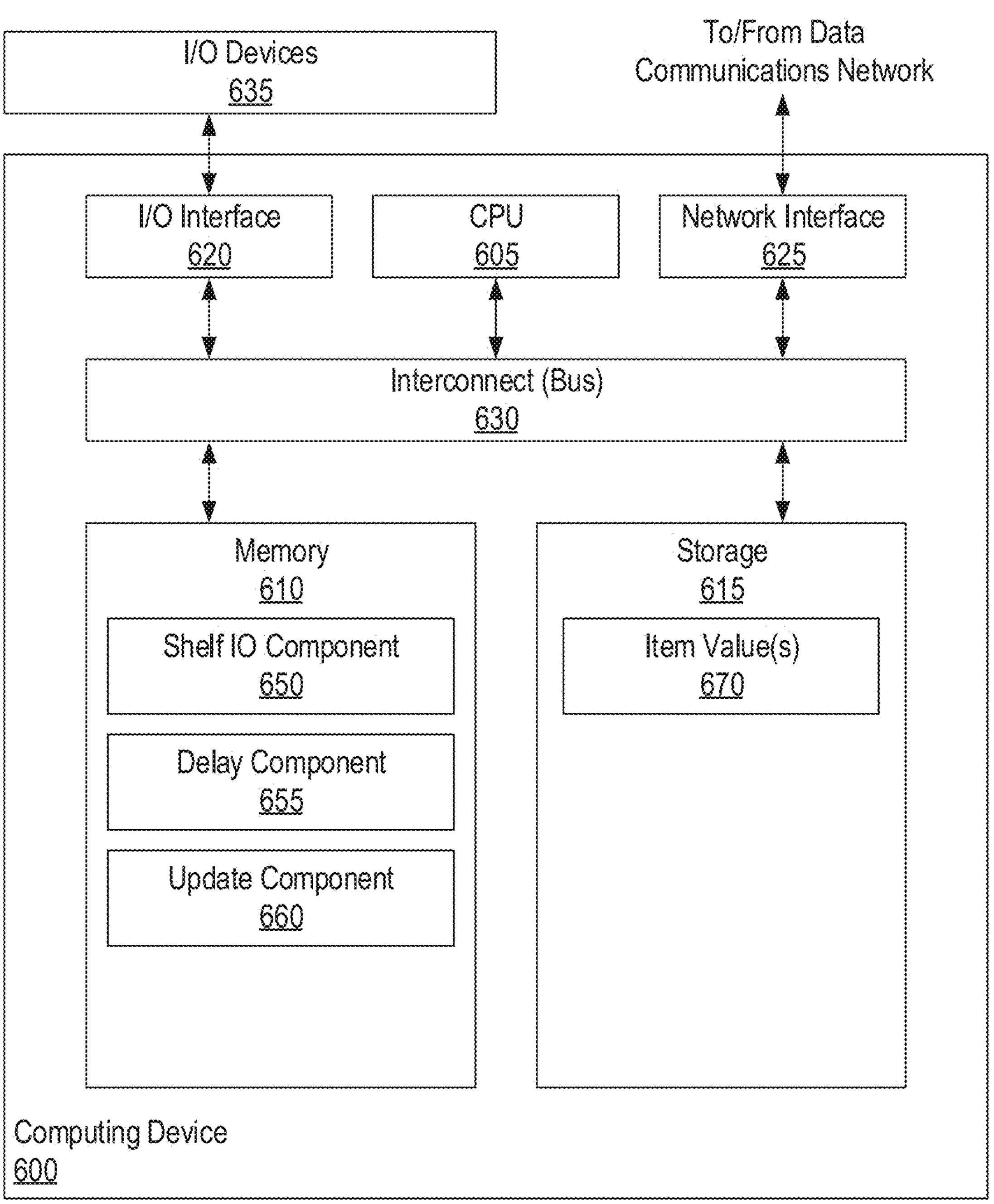
FIG. 6 depicts an example computing device for synchronizing computing system updates, according to some embodiments of the present disclosure.

FIG. 6 depicts an example computing device 600 for synchronizing computing system updates, according to some embodiments of the present disclosure.

Although depicted as a physical device, in some embodiments, the computing device 600 may be implemented using virtual device(s), and/or across a number of devices (e.g., in a cloud environment). In some embodiments, the computing device 600 corresponds to or comprises a transaction system, such as the transaction system 105 of FIG. 1.

As illustrated, the computing device 600 includes a CPU 605, memory 610, storage 615, one or more network interfaces 625, and one or more I/O interfaces 620. In the illustrated embodiment, the CPU 605 retrieves and executes programming instructions stored in memory 610, as well as stores and retrieves application data residing in storage 615. The CPU 605 is generally representative of a single CPU and/or GPU, multiple CPUs and/or GPUs, a single CPU and/or GPU having multiple processing cores, and the like. The memory 610 is generally considered to be representative of a random access memory. Storage 615 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 635 (such as keyboards, monitors, etc.) are connected via the I/O interface(s) 620. Further, via the network interface 625, the computing device 600 can be communicatively coupled with one or more other devices and components (e.g., via a network, which may include the Internet, local network(s), and the like). As illustrated, the CPU 605, memory 610, storage 615, network interface(s) 625, and I/O interface(s) 620 are communicatively coupled by one or more buses 630. In the illustrated embodiment, the memory 610 includes a shelf IO component 650, a delay component 655, and an update component 660.

Although depicted as discrete components for conceptual clarity, in some embodiments, the operations of the depicted components (and others not illustrated) may be combined or distributed across any number of components. Further, although depicted as software residing in memory 610, in some embodiments, the operations of the depicted components (and others not illustrated) may be implemented using hardware, software, or a combination of hardware and software.

In the illustrated embodiment, the shelf IO component 650 (which may correspond to the shelf IO component 106 of FIG. 1) may be used to facilitate updating of shelf IO devices (e.g., the shelf IO devices 125 of FIG. 1 and/or the shelf IO device 200 of FIG. 2), as discussed above. For example, the shelf IO component 650 may transmit updated value(s) to a controller of the shelf IO devices (e.g., the shelf IO system 120 of FIG. 1), requesting that the shelf IO system implement the update on the relevant shelf IO devices.

In the illustrated example, the delay component 655 (which may correspond to the delay component 107 of FIG. 1) may be used to determine delay criteria for updating the values used by the computing device 600, as discussed above. For example, the delay component 655 may compare the new value to the prior or current value to determine whether to delay the update. Similarly, the delay component 655 may determine a delay duration based on a fixed value, based on the location of the item in the space, based on how busy the environment is (e.g., where more users in the space may result in a longer delay duration), and the like. In some embodiments, the delay component 655 may determine to delay the update until an identified set of transactions complete, as discussed above.

In the illustrated embodiment, the update component 660 (which may correspond to the update component 108 of FIG. 1) may be used to update the value(s) used by the computing device 600, as discussed above. For example, the update component 660 may determine whether the delay criteria are satisfied (e.g., whether all relevant shelf IO devices have been updated, whether the duration has expired, whether the relevant transactions have completed, and the like). If so, the update may update the value (e.g., updating the item values 670 used by the transaction system) to reflect the new information.

In the illustrated example, the storage 615 may include item values 670. In some embodiments, as discussed above, the item values 670 may correspond to the value(s) currently in use by the transaction system (e.g., the prices charged to users as they checkout). Although depicted as residing in storage 615, in some embodiments, the item values 670 may be stored in various other locations, including in memory 610.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to the described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not an advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to embodiments of the present disclosure shall not be construed as a generalization of any subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., aspects of the transaction system) or related data available in the cloud. For example, the transaction system could execute on a computing system in the cloud and determine and implement delay criteria to synchronize value updates. In such a case, the transaction system could determine the delay criteria, and store the criteria and/or updated values at a storage location in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A method, comprising:

receiving, from a value database system, an updated value for the physical item for sale in a retail environment;

receiving, from the value database system, a delay time component associated with the updated value for the physical item for sale, wherein the delay time component value represents a traversal time value;

determining that the delay time component exceeds a predetermined threshold associated with a delay duration value for the physical item;

responsive to determining that the delay time component exceeds the predetermined threshold associated with the delay duration value for the physical item, transmitting instructions to a shelf input/output (IO) device to display an alpha-numeric update retail value for the physical item;

receiving, from an image capture device situated in a retail environment, an image of the shelf input/output (IO) device;

analyzing, using an image analysis algorithm, the image of the shelf IO device;

responsive to analyzing the image of the shelf IO device:

identifying a first section of the shelf IO device, wherein the first section comprises a configuration of graphical elements displayed on an electronic display integrated onto the shelf IO device, determining that the configuration of graphical elements displayed on the electronic display match the alpha-numeric update retail value for the physical item; and responsive to the configuration of the graphical elements and the alpha-numeric update retail value matching, transmitting instructions to the value database system to update a transaction system based on the updated retail value.

2. The method of claim 1, further comprising determining that the delay time component does not exceed the predetermined threshold associated with the delay duration value.

3. The method of claim 1, further comprising determining that the updated retail value is higher than the predetermined threshold associated with the delay duration value.

4. The method of claim 1, further comprising determining to delay the updating of the transaction system for a defined period of time.

5. The method of claim 4, further comprising:

identifying a set of transactions associated with a prior value; and determining to delay the updating of the transaction system until a last transaction of the set of transactions is completed.

6. The method of claim 5, wherein identifying the set of transactions associated with the prior value comprises identifying transactions that began, via one or more user devices, prior to receiving the confirmation that the updated value has been implemented by the shelf IO device.

7. The method of claim 5, wherein identifying the set of transactions associated with the prior value comprises identifying a set of users that entered a defined area associated with the physical item prior to receiving the confirmation that the updated value.

8. The method of claim 5, wherein identifying the set of transactions associated with the prior value comprises identifying a set of users that selected the physical item prior to receiving a confirmation that the updated value has been implemented by the shelf IO device.

9. The method of claim 1, further comprising receiving a confirmation from the shelf IO device confirming the updated retail value.

10. The method of claim 9, wherein receiving the confirmation comprises evaluating the shelf IO device associated with the physical item.

11. The method of claim 10, wherein receiving the confirmation further comprises:

determining a first count of the shelf IO device associated with the physical item;

determining a second count of the one or more shelf IO device that are confirmed to be displaying the updated retail value; and confirming that the first count matches the second count.

12. A system comprising:

one or more memories collectively storing computer-executable instructions; and one or more processors configured to collectively execute the computer-executable instructions and cause the system to perform an operation, comprising:

receiving, from a value database system, an updated value for the physical item for sale in a retail environment;

receiving, from the value database system, a delay time component associated with the updated value for the physical item for sale, wherein the delay time component value represents a traversal time value;

determining that the delay time component exceeds a predetermined threshold associated with a delay duration value for the physical item;

responsive to determining that the delay time component exceeds the predetermined threshold associated with the delay duration value for the physical item, transmitting instructions to a shelf input/output (IO) device to display an alpha-numeric update retail value for the physical item;

receiving, from an image capture device situated in a retail environment, an image of the shelf input/output (IO) device;

analyzing, using an image analysis algorithm, the image of the shelf IO device;

responsive to analyzing the image of the shelf IO device:

identifying a first section of the shelf IO device, wherein the first section comprises a configuration of graphical elements displayed on an electronic display integrated onto the shelf IO device, determining that the configuration of graphical elements displayed on the electronic display match the alpha-numeric update retail value for the physical item;

and responsive to the configuration of the graphical elements and the alpha-numeric update retail value matching, transmitting instructions to the value database system to update a transaction system based on the updated retail value.

13. The system of claim 12, further comprising determining that the delay time component does not exceed the predetermined threshold associated with the delay duration value.

14. The system of claim 12, further comprising determining to delay the updating of the transaction system for a defined period of time.

15. The system of claim 12, further comprising:

identifying a set of transactions associated with a prior value; and determining to delay the updating of the transaction system until a last transaction of the set of transactions is completed.

16. The system of claim 12, further comprising evaluating the shelf IO device associated with the physical item to determine a confirmation.

17. A computer program product comprising one or more computer-readable storage media having computer-readable program code collectively embodied therewith, the computer-readable program code collectively executable by one or more computer processors to perform an operation comprising:

receiving, from a value database system, an updated value for the physical item for sale in a retail environment;

receiving, from the value database system, a delay time component associated with the updated value for the physical item for sale, wherein the delay time component value represents a traversal time value;

determining that the delay time component exceeds a predetermined threshold associated with a delay duration value for the physical item;

responsive to determining that the delay time component exceeds the predetermined threshold associated with the delay duration value for the physical item, transmitting instructions to a shelf input/output (IO) device to display an alpha-numeric update retail value for the physical item;

receiving, from an image capture device situated in a retail environment, an image of the shelf input/output (IO) device;

analyzing, using an image analysis algorithm, the image of the shelf IO device;

responsive to analyzing the image of the shelf IO device:

identifying a first section of the shelf IO device, wherein the first section comprises a configuration of graphical elements displayed on an electronic display integrated onto the shelf IO device, determining that the configuration of graphical elements displayed on the electronic display match the alpha-numeric update retail value for the physical item;

and responsive to the configuration of the graphical elements and the alpha-numeric update retail value matching, transmitting instructions to the value database system to update a transaction system based on the updated retail value.

18. The computer program product of claim 17 further comprising determining that the delay time component does not exceed the predetermined threshold associated with the delay duration value.

19. The computer program product of claim 17, further comprising determining to delay the updating of the transaction system for a defined period of time.

20. The computer program product of claim 17, further comprising:

identifying a set of transactions associated with a prior value; and determining to delay the updating of the transaction system until a last transaction of the set of transactions is completed.

* * * * *